C. W. FREDERICK AND F. E. ROSS.
PHOTOGRAPHIC OBJECTIVE.
APPLICATION FILED DEC. 2, 1916.
1,306,958.
Patented June 17, 1919.
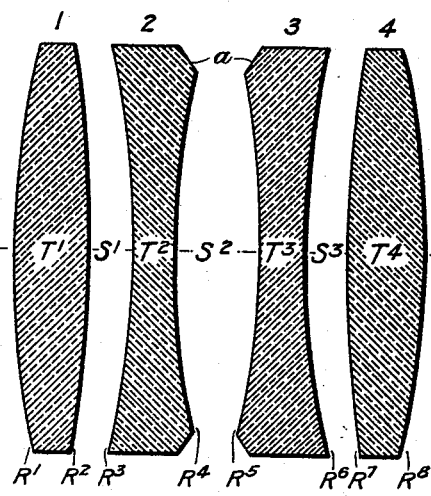
WITNESSES:
INVENTORS
Charles W. Frederick
and Frank E. Ross.
BY
ATTORNEY

UNITED STATES PATENT OFFICE.

CHARLES W. FREDERICK AND FRANK E. ROSS, OF ROCHESTER, NEW YORK, ASSIGNORS TO EASTMAN KODAK COMPANY, OF ROCHESTER, NEW YORK, A CORPORATION OF NEW YORK.

PHOTOGRAPHIC OBJECTIVE.

1,306,958.     Specification of Letters Patent.     Patented June 17, 1919.

Application filed December 2, 1916. Serial No. 134,734.

*To all whom it may concern:*

Be it known that we, CHARLES W. FREDERICK and FRANK E. ROSS, of Rochester, in the county of Monroe and State of New York, have invented certain new and useful Improvements in Photographic Objectives; and we do hereby declare the following to be a full, clear, and exact description of the same, reference being had to the accompanying drawing, forming a part of this specification, and to the reference characters marked thereon.

Our invention relates to a lens and more particularly to a photographic objective and has for an object the provision of a simplified type of four component air spaced lens system comprising two outer positives and two inner negatives, and in which there are so many surfaces of equal radii of curvature that the objective may be easily and cheaply manufactured and readily assembled without confusion and loss of parts, and in which the surfaces to have equal radii and the numerical values of the characteristics of the objective have been so chosen and the refractive indices of the glass for the lens have been so selected that the system as a whole is especially corrected for coma, as well as the other lens imperfections, such as, spherical and chromatic aberrations, astigmatism, curvature of field and distortion, and that the objective has a large covering power.

To this and other ends the invention resides in certain improvements and combinations of parts all as will be hereinafter more fully described, the novel features being pointed out in claims at the end of the specification.

In the practice of our invention, we find that we can simplify the form of the objective and grind all the surfaces of the negative lenses to one radius of curvature, a feature of great practical importance in manufacturing, as but one set of grinding tools is required for these lenses and mistakes in beveling the wrong side of the lens for assembling in the cell cannot occur, due to the interchangeability of these lenses. Heretofore, in a combination possessing the advantages of this simplified form of objective, it has been impossible to make adequate corrections for that error known as coma, which seriously impairs the usefulness of the lens. Coma appears in the image formed by pencils of light passing obliquely through the lens, so that instead of a point image being formed of a point object the image falling upon the photographic plate is an imperfect nucleus having streamers of light extending out from it. If the lines of a picture are built up of such imperfect images, their edges will not be sharp, but shaded out or hazed by the presence of the streamers, thus causing the picture to lack sharpness of definition or distinctness of detail.

We have found that coma is an aberration inherent in a symmetrical system involving four air spaced lenses of this type and that any method of correcting for this error renders the system unsymmetrical in some respect, it being noted that the shapes of the simple lenses have the greatest influence upon this lens error. Due to the necessity for guarding against spherical aberration, as well as coma, it has formerly been necessary to render each of the negatives unsymmetrical in form and of such curvatures as to reduce the spherical aberration. We have discovered, however, that we may make the negative lenses entirely alike in glass and in all radii of curvature and yet have the defects of coma and spherical aberration reduced to a harmless amount in the combination.

Since we confine our negative lenses to a single shape, the problem of making a corrected system is rendered difficult, involving among other considerations determining the characteristics of the glass to be selected for the different lenses, and especially the forms of the positives. To correct for coma, we make the positive lenses different in form, thus rendering the combination essentially unsymmetrical as a whole. Furthermore, owing to the limitation imposed on us by having the negatives alike, we cannot adjust for spherical aberration by varying the curves of the negatives. We, however, accomplish the desired result in an indirect manner, in view of our finding that spherical aberration depends to a large extent on the spacings between the positive and negative lenses, and on the radii of curvature and the indices of refraction of the glasses, as set forth more particularly hereinafter. Hence, we select such properties for the glasses, especially with regard to dispersion and refractive index that, when the objective is corrected for the other lens errors, there results a narrow spacing and a shortening of the distance of travel of the annular or oblique rays between the positive and negative lenses, and such a relation of lens characteristics that this error of spherical aberration is reduced to a negligible amount.

In order to specifically illustrate one embodiment of our invention conforming to the requirements set forth, reference is had to the accompanying drawing, representing in a diagrammatic exaggerated view, an optically corrected lens system of great covering power. In the form illustrated, the line of sight passes from left to right as indicated by the arrow in the figure, the positive lens 1 being the front lens of the objective. This double convex lens 1 is made of crown glass of high refractive index and is separated by a small air space from a double concave lens 2 of flint glass of lower refractive index, which is equal in dimensions with another negative lens 3 of the same material and refractive index, the two negative lenses being sufficiently separated to allow insertion of the required parts of shutter and diaphragm and each beveled on its inner edge $a$ so as to fit into a lens cell. A positive lens 4 similar to the lens 1 in glass and refractive index constitutes the last element of the system, it being separated from the negative lens 3 by a suitable air space. The lens 4 is not like the lens 1 in its dimensions, as will hereinafter appear in the appended table, and, in this embodiment of our invention, the rear lens 4 has greater power than the front lens 1, thereby increasing the covering power of the objective.

In the accompanying table setting forth one form of our lens system, the numerical measurements are given in fractions of the focal length, so that by a simple multiplication of these values by the required focal length, given in inches, millimeters, or other units, we arrive at the data for the corresponding lens calculated in the same units of measurement as the focal length:

| Lenses. | Glass. | Radii. | Thicknesses and separations. |
|---|---|---|---|
| (1) Positive | $G=1.64640$<br>$D=1.63148$ | $R_1=0.2735$<br>$R_2=0.7683$ | $T_1=0.0283$ |
| | | | $S_1=0.0158$ |
| (2) Negative | $G=1.62348$<br>$D=1.60534$ | $R_3=0.4054$<br>$R_4=0.4054$ | $T_2=0.0118$ |
| | | | $S_2=0.0354$ |
| (3) Negative | $G=1.62348$<br>$D=1.60534$ | $R_5=0.4054$<br>$R_6=0.4054$ | $T_3=0.0118$ |
| | | | $S_3=0.0158$ |
| (4) Positive | $G=1.64640$<br>$D=1.63148$ | $R_7=0.6638$<br>$R_8=0.2531$ | $T_4=0.0283$ |

In the above table, the radii, thicknesses, separations, and refractive indices of the lenses illustrated are particularly set forth, $R_1$, $R_2$, etc., representing the radii, $T_1$, $T_2$, etc., the thicknesses of the lenses, $S_1$, $S_2$, etc., the thicknesses of the air spaces between the lenses, the successive characteristics being identified by subscript numerals ascending from left to right, in accordance with the reference characters on the drawing. In this table G is the index of refraction of the glass for the hydrogen blue or G′ line of the spectrum, while D represents the index of refraction for the sodium yellow or D line.

In our system, the essential condition is that $R_3=R_4=R_5=R_6$. A further function inherent in the lens set forth in the above table, relating to coma, is:

$$1/R_1+1/R_7<1/R_2+1/R_8$$

according to which the sum of the reciprocals of the radii of curvature of the front surfaces of the positive lenses is less than the sum of the reciprocals of the radii of curvature of the rear faces of said positive lenses, the best results being obtained when the second member of this inequality is greater than the first member by about two per cent.

In order to adjust for spherical aberration in a lens of the type herein described, we find that the following mathematical relations should be satisfied:

$$n.(G'_1-D_1).(1/R_1+1/R_2+1/R_7+1/R_8)=\\(G'_2-D_2).(1/R_3+1/R_4+1/R_5+1/R_6)$$

$$n<1.2$$
$$n>1.1$$

In our specific lens described in the above table $n=1.1516$.

The subscripts 1 and 2 used with letters D and G are intended to identify the positive and negative lenses, respectively, $D_1$ and $G'_1$ referring to the glass of the positive lenses and $D_2$ and $G'_2$ referring to the glass of the negative lenses.

In accordance with the above equation, the sum of the reciprocals of the radii of curvature of the positive lenses multiplied by the dispersion of the glass of the positives (D to G′) multiplied by the factor $n$, ranging in value from 1.1 to 1.2, will equal the sum of the reciprocals of the radii of curvature of the negative lenses multiplied by the dispersion (D to G′) of the glass of the negative lenses. In the above relation, the dispersion is the difference in refractive index between the D and G′ lines of the spectrum.

Having thus described our invention, what we claim as new is:

1. A photographic objective comprising two biconcave lenses in which all radii of curvature are equal and two positive lenses unsymmetrical with respect to each other, the constants of the objective being so chosen that the objective is especially corrected for coma.

2. A photographic objective comprising two inner air spaced negative lenses in which all radii of curvature are equal and two outer positive lenses air spaced from the negative lenses, said positive lenses being unsymmetrical with all four radii of curvature unequal, the constants of the objectives being such that the objective is especially corrected for coma.

3. A photographic objective comprising two inner air spaced negative lenses which are of the same glass and have all four radii of curvature equal and two outer positive lenses air spaced from the negative lenses, both positives being made of the same glass having a higher index of refraction than that of the negative lenses, said positive lenses having all four radii of curvature unequal so as to render the lens system unsymmetrical, the constants of the objective being so chosen that the objective is especially corrected for coma, as well as spherical aberration, chromatic aberration, distortion, curvature of field and astigmatism.

4. An optically corrected photographic objective, comprising two inner air spaced negative lenses which are of the same glass and have all four radii of curvature equal and two outer positive lenses air spaced from the negative lenses, both made of the same glass having a higher index of refraction than that of the negative lenses, said positive lenses having all four radii of curvature unequal, the lens system being thereby rendered unsymmetrical, said positive and negative lenses being spaced apart by small distances, the constants of the objective including the radii of curvature, spacing and the properties of the glass being so selected that the objective is corrected for coma, spherical aberration and other lens errors.

5. In a photographic objective, a four component air spaced lens system substantially free from coma, as well as other lens imperfections, comprising two outer positive lenses of like glass and two inner negative lenses of like glass differing from that of the positive lenses, the four radii of curvature of the surfaces of the negative lenses being equal in dimensions and the sum of the reciprocals of the radii of curvature of the front surfaces of the positive lenses being less than the sum of the reciprocals of the radii of curvature of the rear surfaces of said positive lenses.

6. A photographic objective corrected for coma and spherical aberration comprising two outer positive lenses of the same glass and two inner negative lenses of like glass differing from that of the positive lenses, the glass and the radii of curvature being such as to satisfy the following relations:

$$R_3 = R_4 = R_5 = R_6$$
$$1/R_1 + 1/R_7 < 1/R_2 + 1/R_8$$
$$n.(G'_1 - D_1).(1/R_1 + 1/R_2 + 1/R_7 + 1/R_8) = (G'_2 - D_2).(1/R_3 + 1/R_4 + 1/R_5 + 1/R_6);$$

the value of $n$ being less than 1.2 and greater than 1.1.

7. A photographic objective of the form and dimensions substantially as set forth, comprising a front positive lens having a thickness of approximately 0.028 and front and rear faces whose radii of curvature are respectively approximately 0.273 and 0.768, two negative lenses air spaced from each other and the positive lenses and having the same thickness of approximately 0.012 and the common radius of curvature of approximately 0.405 for all four faces, and a rear positive lens of the same thickness as the front lens having front and rear radii of curvature of approximately 0.664 and 0.253 respectively, said positive and negative lenses being made of glasses having indices of refraction of approximately 1.646 and 1.623 respectively for the hydrogen blue line of the spectrum and approximately 1.631 and 1.605 respectively for the sodium yellow line, and said lenses being separated from front to rear by the distances of approximately 0.016, 0.035 and 0.016 respectively, all dimensions being calculated in fractions of the focal length of the objective.

In witness whereof we hereunto subscribe our names this 1st day of December 1916.

CHARLES W. FREDERICK.
FRANK E. ROSS.

In the presence of—
HELEN M. FRASER,
GILBERT S. DEY.

Copies of this patent may be obtained for five cents each, by addressing the "Commissioner of Patents, Washington, D. C."